United States Patent
Winquist et al.

(12)

(10) Patent No.: US 6,401,754 B1
(45) Date of Patent: Jun. 11, 2002

(54) FOUR WAY VALVE

(75) Inventors: Melvin Winquist, Worcester, MA (US); David Bayreuther, Griswold, CT (US)

(73) Assignee: Metso Automation USA Inc., Dover, DE (US)

( * ) Notice: Subject to any disclaimer, the term of this patent is extended or adjusted under 35 U.S.C. 154(b) by 0 days.

(21) Appl. No.: 09/686,819

(22) Filed: Oct. 12, 2000

(51) Int. Cl.[7] ............................................. F16K 11/08
(52) U.S. Cl. .................................. 137/625.47; 251/174
(58) Field of Search ..................... 137/625.43, 625.46, 137/625.47; 251/174

(56) References Cited

U.S. PATENT DOCUMENTS

| | | | |
|---|---|---|---|
| 2,621,886 A | 12/1952 | Mueller | |
| 2,623,724 A | * 12/1952 | Downey | 251/174 X |
| 2,631,002 A | 3/1953 | Mueller | |
| 2,837,308 A | * 6/1958 | Shand | 251/174 |
| 3,194,267 A | * 7/1965 | Lyon et al. | 137/624.43 X |
| 3,401,915 A | 9/1968 | Kim | |
| 3,504,706 A | * 4/1970 | Schmitz | 137/625.43 |
| 3,826,466 A | 7/1974 | Scaglione | |
| 3,848,637 A | * 11/1974 | Wilson | 137/625.43 X |
| 3,874,637 A | 4/1975 | Jones | |
| 3,906,997 A | 9/1975 | Scaglione | |
| 4,004,775 A | 1/1977 | Jones | |
| 4,318,420 A | 3/1982 | Calvert | |
| 4,428,561 A | * 1/1984 | Thompson | 251/174 |
| 4,477,055 A | 10/1984 | Partridge | |
| 4,483,511 A | 11/1984 | Kushida | |
| 4,506,697 A | 3/1985 | Marchant | |
| 4,601,308 A | 7/1986 | Stone | |
| 4,836,250 A | 6/1989 | Krambrock | |
| 4,911,408 A | 3/1990 | Kemp | |
| 4,972,877 A | * 11/1990 | Halemba et al. | 137/625.43 X |
| 5,163,655 A | 11/1992 | Chickering, III | |
| 5,207,246 A | 5/1993 | Meyer | |
| 5,271,426 A | 12/1993 | Clarkson | |
| 6,230,744 B1 | * 5/2001 | Ahrweiler | 137/625.47 |

FOREIGN PATENT DOCUMENTS

WO 98/36122 * 8/1998

* cited by examiner

Primary Examiner—John Rivell
(74) Attorney, Agent, or Firm—Oblon, Spivak, McClelland, Maier & Neustadt, P.C.

(57) ABSTRACT

A four way valve which is relatively easy to manufacture and which is smaller than conventional four way valves for a given bore size or flow capacity. The valve can be formed utilizing a closure having a pair of intersecting bores, with a separator provided within the closure to form two isolated passageways or flow paths. An improved sealing/seating arrangement is also provided.

40 Claims, 8 Drawing Sheets

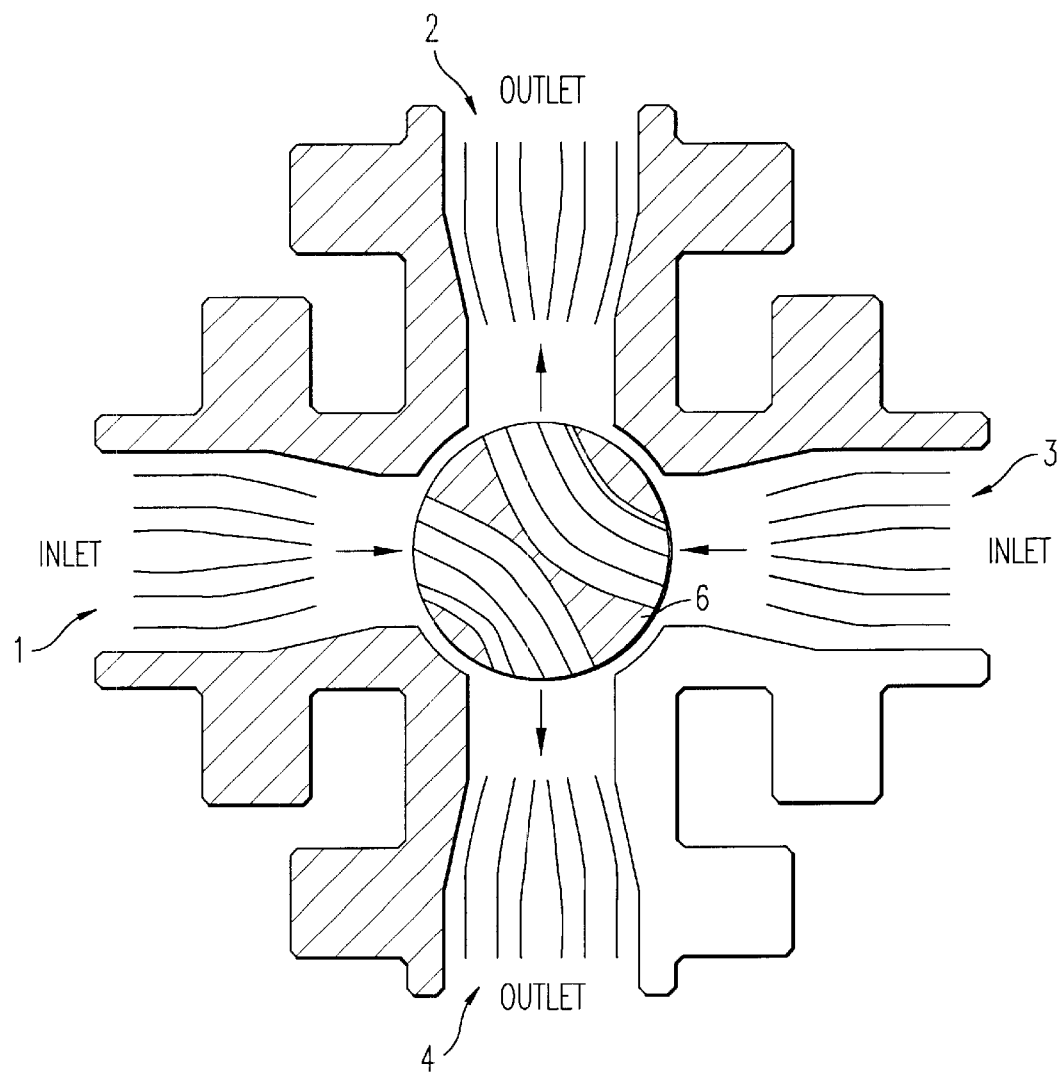

FOUR WAY VALVE

BACKGROUND OF THE INVENTION

1. Field of the Invention

The invention relates to valves, and particularly to four way ball valves, however certain aspects of the invention (e.g., an improved seat/seal assembly) can also be advantageously utilized in other types of valves.

2. Discussion of Background

FIG. 6 schematically depicts a conventional four way valve. The arrangement can accommodate two inlet flows and provide two outlet flows, and can be used where it is desired to switch or alternate the fluid flows to be fed to different parts of a fluid system. By way of example, a fluid flow system might utilize different fluids and, periodically, it is desired to switch or change the fluids which are to be fed into different flow paths of the system. As shown in FIG. 6, utilizing a four way valve, a single valve can switch a pair of inlets and outlets to change the relationships of the inlets and outlets. The valve of FIG. 6 includes inlets 1, 3 and outlets 2, 4, with the position of the ball closure 6 determining the communicating relationships of the inlets and outlets. In the position shown in FIG. 6, the inlet 1 communicates with the outlet 4 and the inlet 3 communicates with the outlet 2. By rotating the ball closure 6 by 90°, the inlet 3 then communicates with the outlet 4, and the inlet 1 communicates with the outlet 2. Thus, the inlet 1 can be selectively placed in communication with the outlet 2 or the outlet 4, while the inlet 3 is in communication with whichever outlet is not in communication with inlet 1.

FIG. 7 is an enlarged cross-sectional view of the ball closure 6 for the four way valve of FIG. 6. As shown, the closure 6 includes two bores 6a, 6b to provide two flow paths between the inlets 1, 3 and outlets 2, 4 as discussed above with reference to FIG. 6. One of the problems with such a prior art valve is that, in order to accommodate for the bores 6a, 6b, the size of the ball closure is large. In addition, due to the size of the ball closure, the torque required to rotate the ball is also large, and the actuator (the device which turns a valve) must therefore be sized to be able to overcome this torque.

The conventional four way valve is undesirable in a number of respects. First, due to the size of the ball closure, the other components of the valve, such as the housing, seats/seals, stems, linkages, must be larger, resulting in higher raw materials costs. In addition, higher manufacturing costs are encountered in forming the various components. The excessive size for a given bore size for the conventional four way valve not only results in excessive costs, but also, the size for which the valve can be practically manufactured is limited. For example, with the conventional arrangement, it is impractical to manufacture valves which are larger than 6"-8" in bore diameter, since the overall valve size becomes excessively large.

As an alternative to the use of a four way valve, a series of valves and additional piping can be utilized. For example, as shown in FIG. 8 (in which inlet and outlet numbers corresponding to FIG. 6 are designated similarly, with the addition of ten), an inlet 11 can alternatingly feed outlets 12, 14 utilizing a pair of valves 16a, 16b. In particular, when the valve 16a is "on," and valves 16b and 16c are "off," the flow passes from the inlet 11 to the outlet 12. When valves 16a and 16d are "off" and the valve 16b is "on," the flow passes from the inlet 11 to the outlet 14. Similarly, the flow from inlet 13 can be alternatingly fed to the outlets 12, 14, with the flow fed from 13 to 12 when 16c is "on" and 16a and 16d are "off," and with the flow from 13 to 14 when valves 16b and 16c are "off" and valve 16d is "on." As should be readily apparent, such is more complex and expensive in that four valves and additional piping are required. Moreover, the system is further complicated in requiring a control system which turns the valves on and off in concert.

A further difficulty with the conventional four way valve resides in providing a reliable and durable seating arrangement. The seat or seal is a part which contacts the ball closure so that there is no leakage (or at least minimal leakage) around the ball closure (and the flow passes only through the bores of the closure without bypassing the closure). Since the ball closure moves over the seat as it is being moved to different positions, the seat can wear (causing leakage between the seat and the ball closure), particularly if the valve application calls for the valve to be repeatedly switched (e.g., a million cycles per year). To minimize leakage, a seal can be held tightly against the ball closure, however, particularly with the large conventional four way valve, a large torque is then required to move the valve, making it more difficult to control position and rapidly change the position of the ball closure.

Accordingly, an improved four way valve is needed.

SUMMARY OF INVENTION

It is therefore an object of the invention to provide an improved four way valve which is relatively easy to manufacture and which is smaller than the conventional valve for a given bore size or valve flow capacity. In accordance with the present invention, a standard ball closure is utilized with a pair of intersecting bores extending through the ball closure. An elliptical separator is then provided within the ball closure so that the cross-bores form two isolated passageways (or flow paths) through the closure, and thereby provide a four way valve closure. With this arrangement, the size of the closure for a given bore diameter is greatly reduced. By way of example, with a prior art four way valve as shown in FIG. 7, the ratio of the ball diameter to the bore diameter is approximately 3 to 1. In other words, a valve with a 6 inch diameter bore requires a ball which is approximately 18 inch in diameter. By contrast, with the present invention, the ratio of the ball diameter to the bore diameter can be reduced to 2 to 1 or less. Thus, a valve with a 6 inch diameter bore can be achieved having a ball with a spherical diameter of approximately 12 inches or less. As a result, materials costs are reduced, not only for the ball closure, but also for the other components of the valve, such as the valve housing, seats, stems, etc. Further, the torque required to turn the valve is reduced, and it can therefore also be possible to utilize a smaller actuator or other means for turning the valve. The invention also provides an improved sealing/seating arrangement in which the seal or seat is spring loaded against the closure member. As a result, a reliable seal can be maintained over a large number of cycles as discussed in further detail herein.

BRIEF DESCRIPTION OF THE DRAWINGS

A more complete appreciation of the invention and many of the attendant advantages will become apparent from the detailed description which follows, particularly when read in conjunction with the accompanying drawings in which.

DETAILED DESCRIPTION OF THE PREFERRED EMBODIMENT

Figure 1:
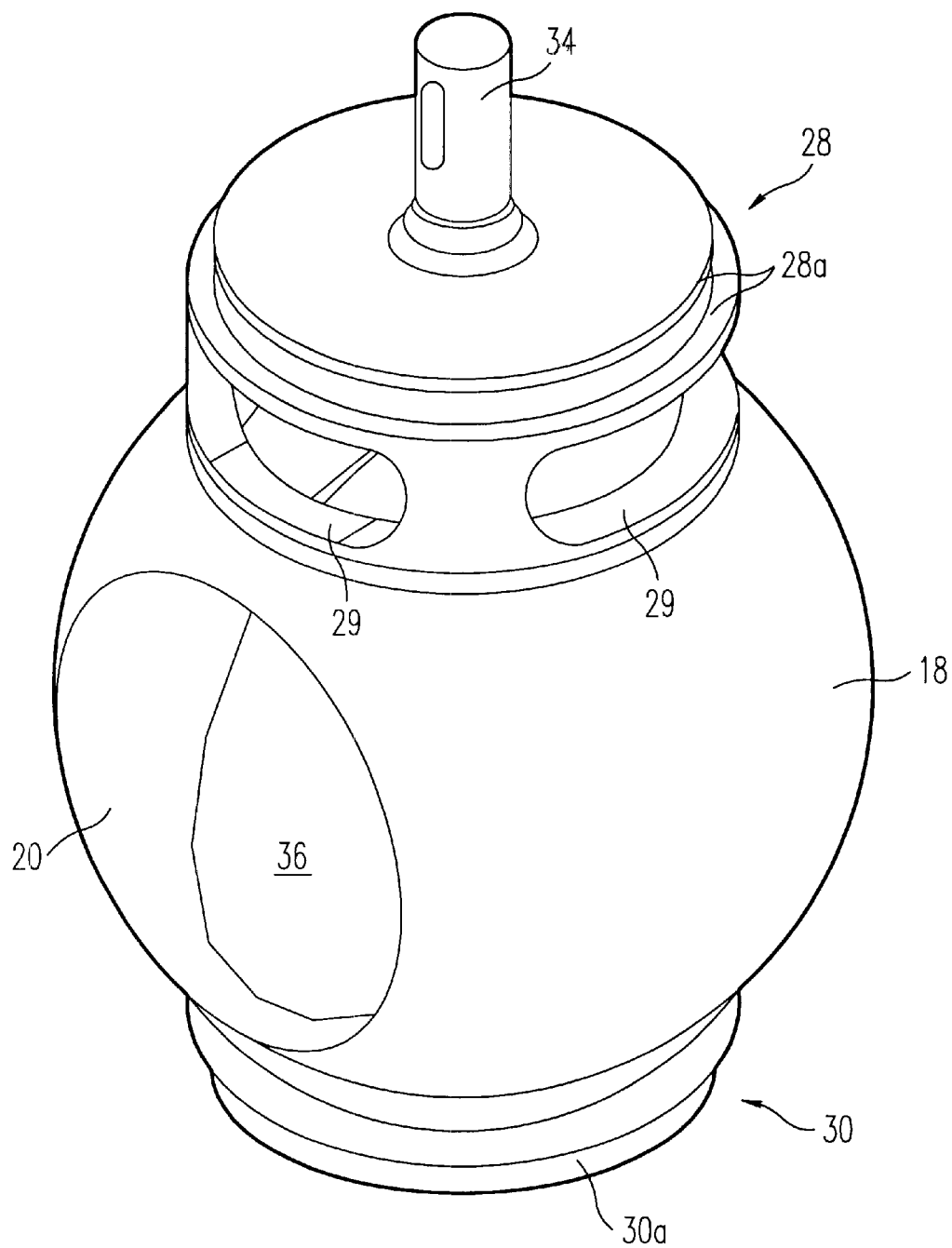
FIG. 1 is a perspective view of the four way closure member of the invention.
Figure 2:
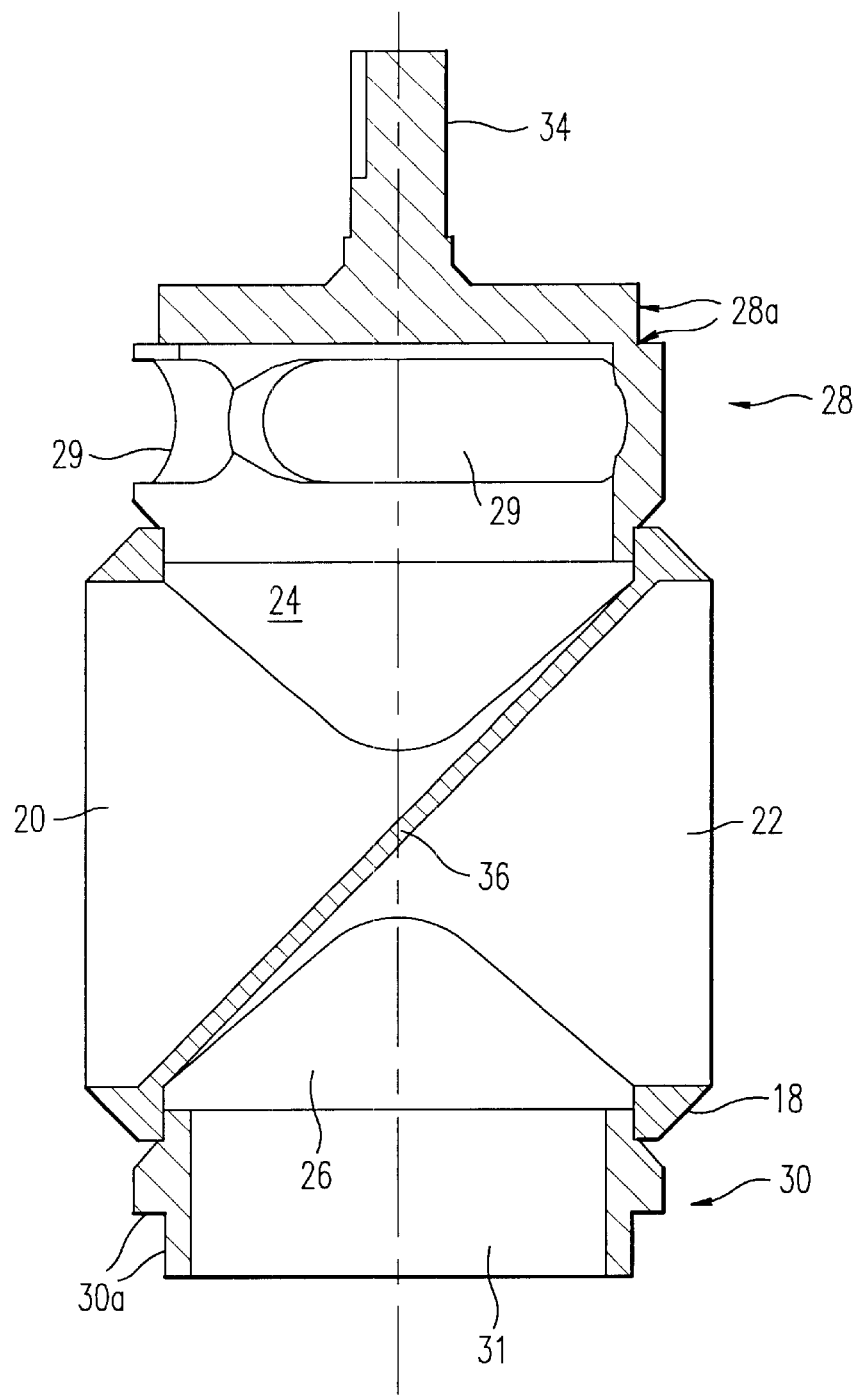
FIG. 2 is a side cross-sectional view of the ball closure of FIG. 1.

FIGS. 1 and 2 respectively depict perspective and cross-sectional views of a preferred form of the closure member for a four way valve in accordance with the invention. As shown, four ports are provided in the ball valve closure. With reference to FIG. 2, the ports include left and right ports 20, 22, and top and bottom ports 24, 26. (Left, right, top and bottom are used herein for ease of reference with respect to the orientations shown in the drawings. It is to be understood that, when installed, the valve can be oriented differently than shown in the drawings.) In the embodiment shown in FIGS. 1 and 2, the ball closure is a trunion-type ball, with trunions 28, 30 provided on the top and bottom of the ball. The trunions provide support and bearing surfaces for rotatably mounting the ball closure. It is to be understood that the present invention could also be utilized in non-trunion mounted closures, or with only a single trunion. For example, in lieu of a trunion mounting at the bottom of the ball closure, the bottom port of the closure can directly communicate with the bottom opening of the valve housing, with a seal provided to prevent leakage of the fluid flow between the closure and the housing. The top trunion could also be eliminated, for example, by mounting the valve shaft (or stem) to an apertured plate or a spoke-like assembly which is connected to the ball at the location of the top port of the ball closure (so that the fluid can flow through the top port 24). Accordingly, while the presently preferred embodiment includes top and bottom trunions, it is to understood that the invention is also applicable to arrangements which include a single trunion or no trunions. In addition, although a ball closure is presently preferred, it is also to be understood that closure members of other shapes (e.g., cylindrical) could also be utilized.

In the arrangement shown in FIGS. 1 and 2, a shaft 34 (which is also called a "stem") is connected to the trunion 28 for rotating the ball closure. As also shown in the drawings, the top trunion 28 includes a plurality of apertures 29. The apertures 29 allow the flow to pass from the port 24, through the trunion 28, with the fluid exiting the trunion via apertures 29. The lower trunion 30 is generally cylindrical and includes an aperture 31 so that the flow passing into or out of the port 26 flows through the aperture 31. A separator or divider 36 separates the ports 22, 26 from the ports 20, 24, so that two flow paths are provided. In particular, flow which enters port 22 will exit port 26 (and vice versa depending upon the direction of the flow, i.e., flow which enters port 26 will exit port 22), while flow which enters port 20 will exit port 24 (and vice versa).

Figure 8:
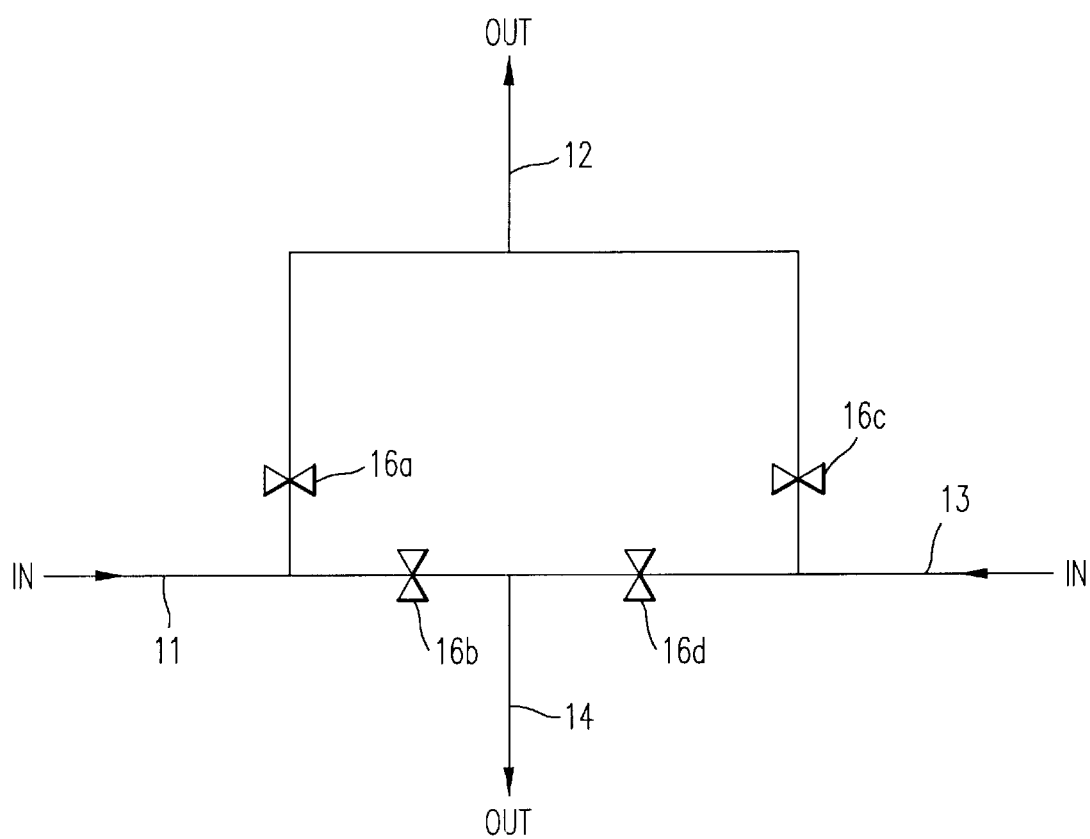
FIG. 8 is a schematic representation of a flow system in which on-off valves are utilized in lieu of a four way valve.
Figure 4:
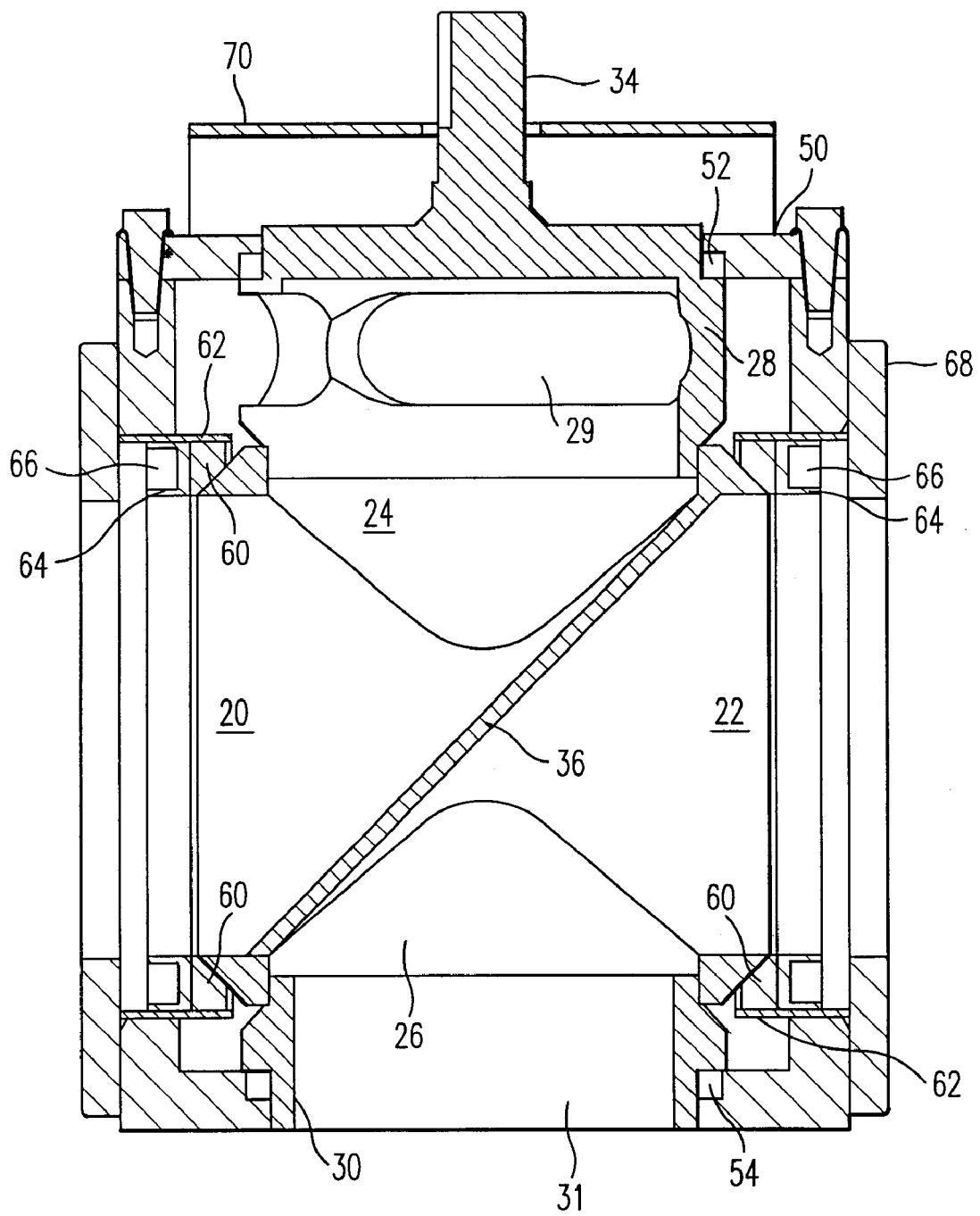
Figure 5:
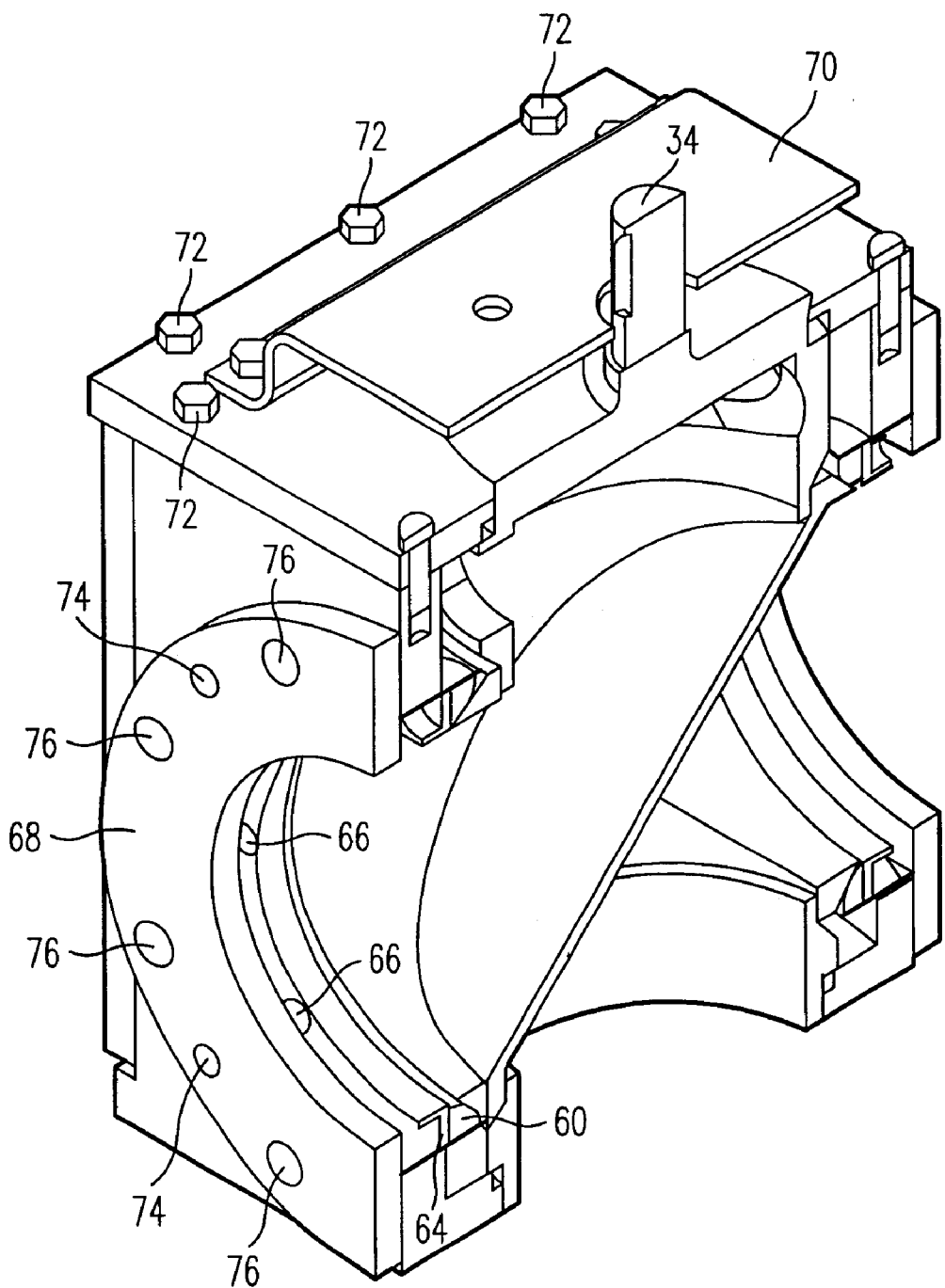

As should be apparent, the valve closure is advantageous as compared with the prior arrangement in a number of respects. First, the bore size for a given ball diameter are significantly larger than that of the prior art arrangement. As discussed earlier, the ratio of the ball diameter to the bore diameter can be on the order of 2 to 1 or less, while with the prior four way valve, a ball diameter of approximately 3 times the size of the bore was needed. This not only made the conventional valve costly, but restricted the size which could be practically manufactured. Accordingly, where a very large flow or flow rate is required, the conventional four way valve could not be utilized and alternate solutions would be necessary, for example, utilizing plural valves as discussed earlier with reference to FIG. 8. However, utilizing a series of valves is undesirable in that the cost of the valves and associated piping is less than optimal, and the control system required to operate the valves in concert becomes more complex. Moreover, as noted earlier, with a large conventional four way valve, additional complications are encountered in terms of the torque required to turn the valve (and thus the actuator required to turn the valve) and such problems can be particularly troublesome where the valve is required to rapidly and repeatedly switch flow relationships.

An additional advantage of the valve in accordance with the invention is that it is relatively simple to manufacture. In particular, the ball closure 18 can be formed simply by machining two cross bores (or, if desired, casting a valve with two cross bores), with one bore extending from port 20 to port 22 and the other extending from port 24 to 26. The separator 36 can then be inserted into the closure so that it extends across the intersection of the bores to separate the ports of each bore and form the two flow paths. In a present form, the separator 36 is a plate which is affixed inside of the ball closure 18, for example, by welding. In the embodiment shown in FIGS. 1 and 2, the separator 36 is an elliptical plate.

Figure 3:
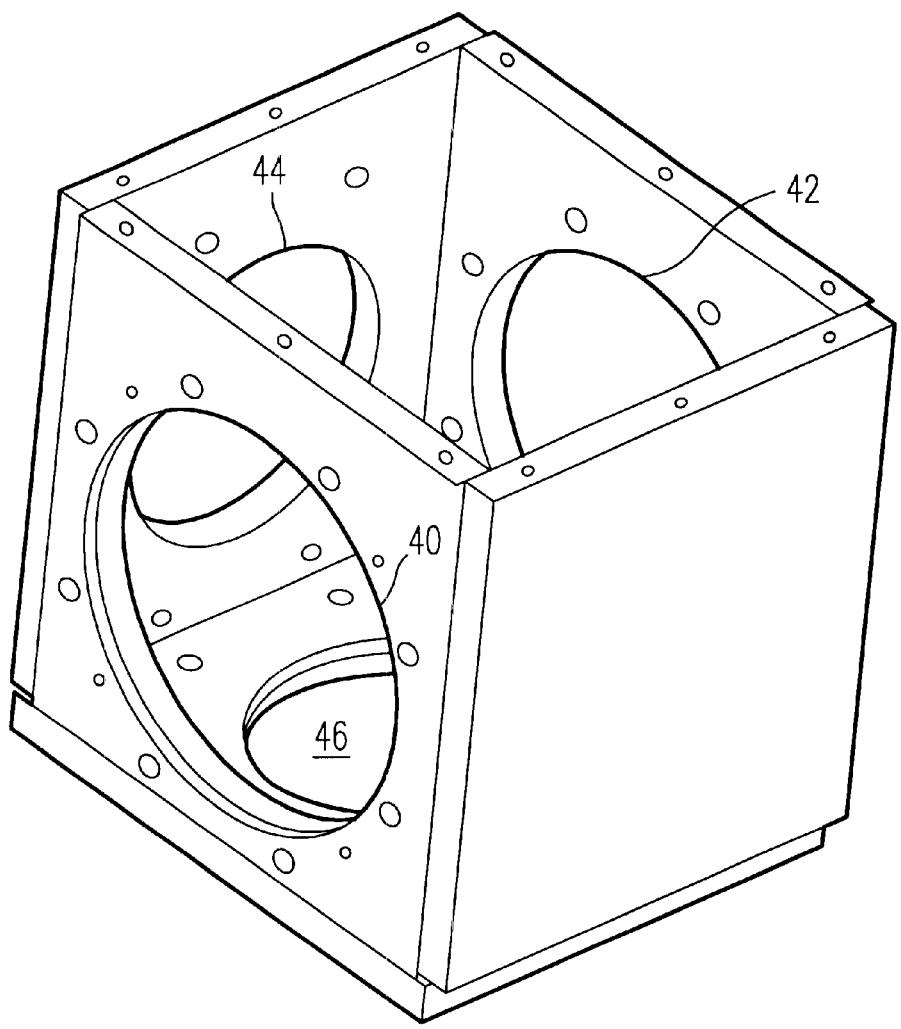
FIG. 3 is a perspective view of a present form of the valve housing (or valve body) of the invention with the top removed.

Referring now to FIG. 3, a housing for the closure of FIGS. 1 and 2 is shown, with the top of the housing removed. The housing includes four openings, 40, 42, 44 and 46 to allow the passage of fluid for the four ports of the ball closure. (As discussed hereinafter, the housing top includes a fifth opening which is not a flow passageway, but which receives the top trunion of the closure member.) The housing can be formed, for example, of carbon steel. In the arrangement of FIG. 3, the housing is formed of welded steel plates, however it is to be understood that the housing can have various forms, for example, with the housing being cast and having a different shape than that shown in FIG. 3.

The lower trunion 30 sits into the bottom aperture 46 so that the flow passing through the port 26 and aperture of the trunion 30 also passes through the aperture 46. The flow which passes through the upper port 24 of the ball closure 18 passes through the apertures 29 and then into the valve housing itself (in the space between the closure member and the housing). Since the other apertures are sealed (as discussed in further detail hereinafter), the flow exiting the apertures 29 and into the housing exits through the aperture 44.

Figure 4:
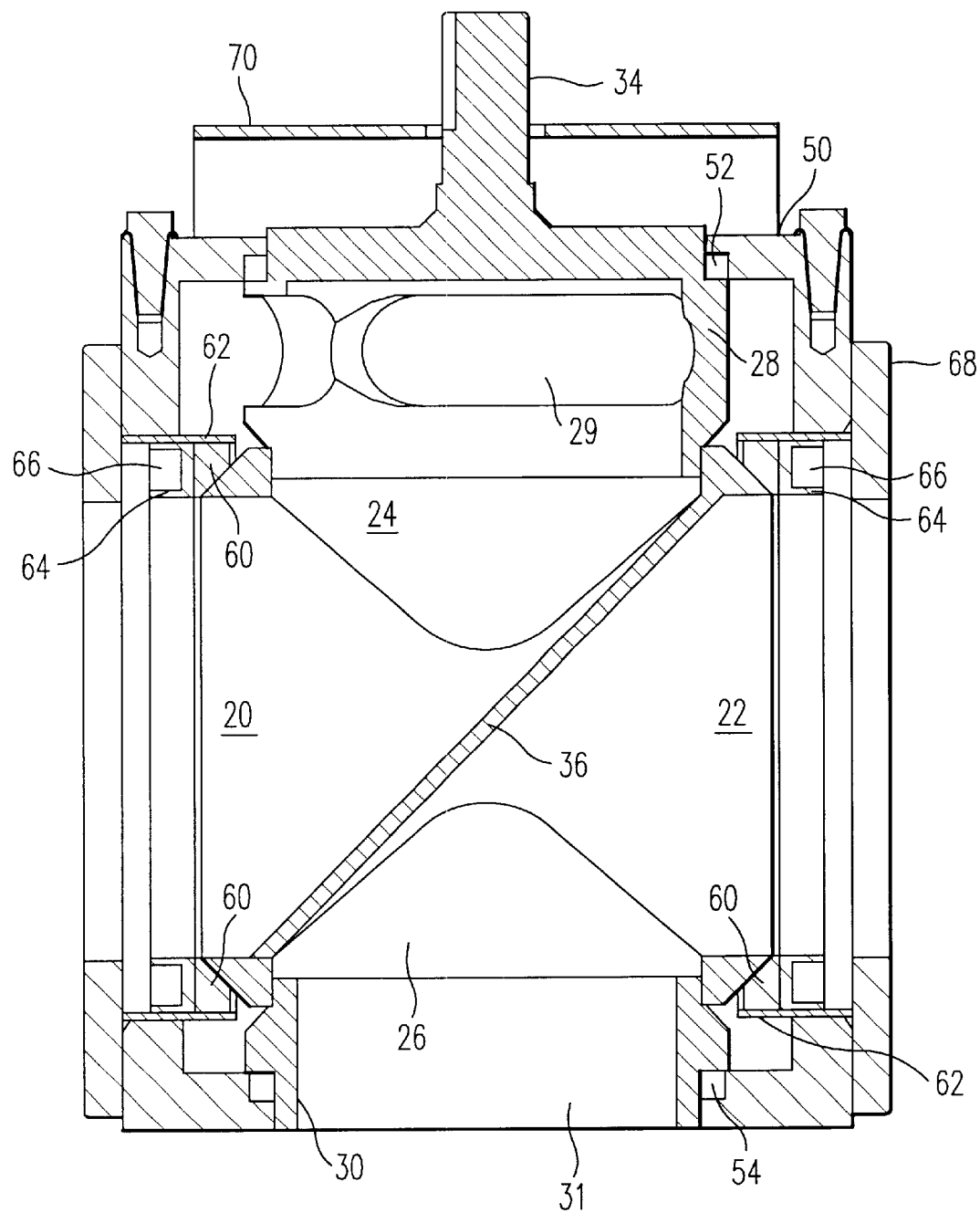
FIG. 4 is a side cross-sectional view of the assembled valve of the invention.
Figure 5:
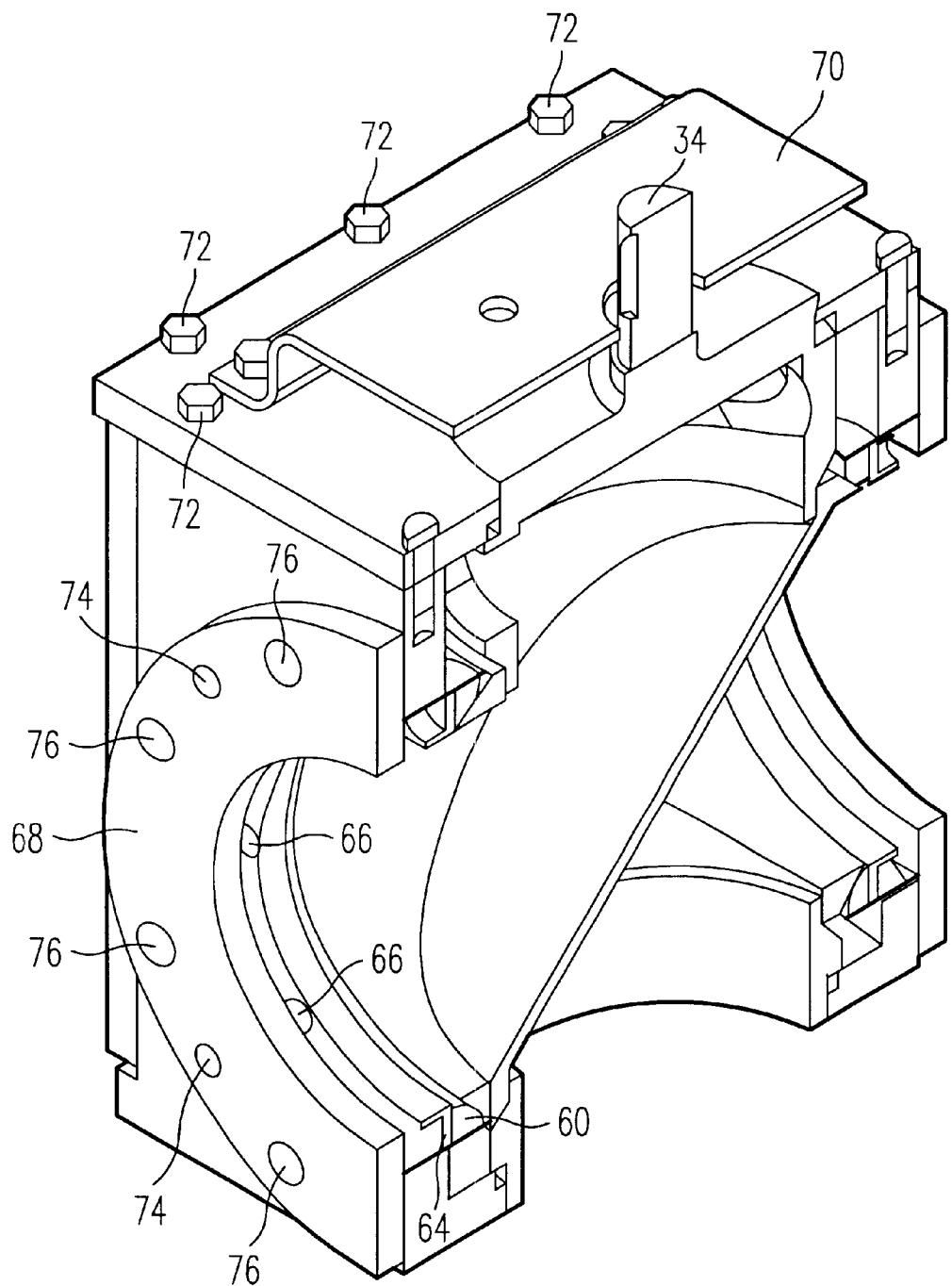
FIG. 5 is a cut away perspective view of the valve of FIG. 4.
Figure 7:
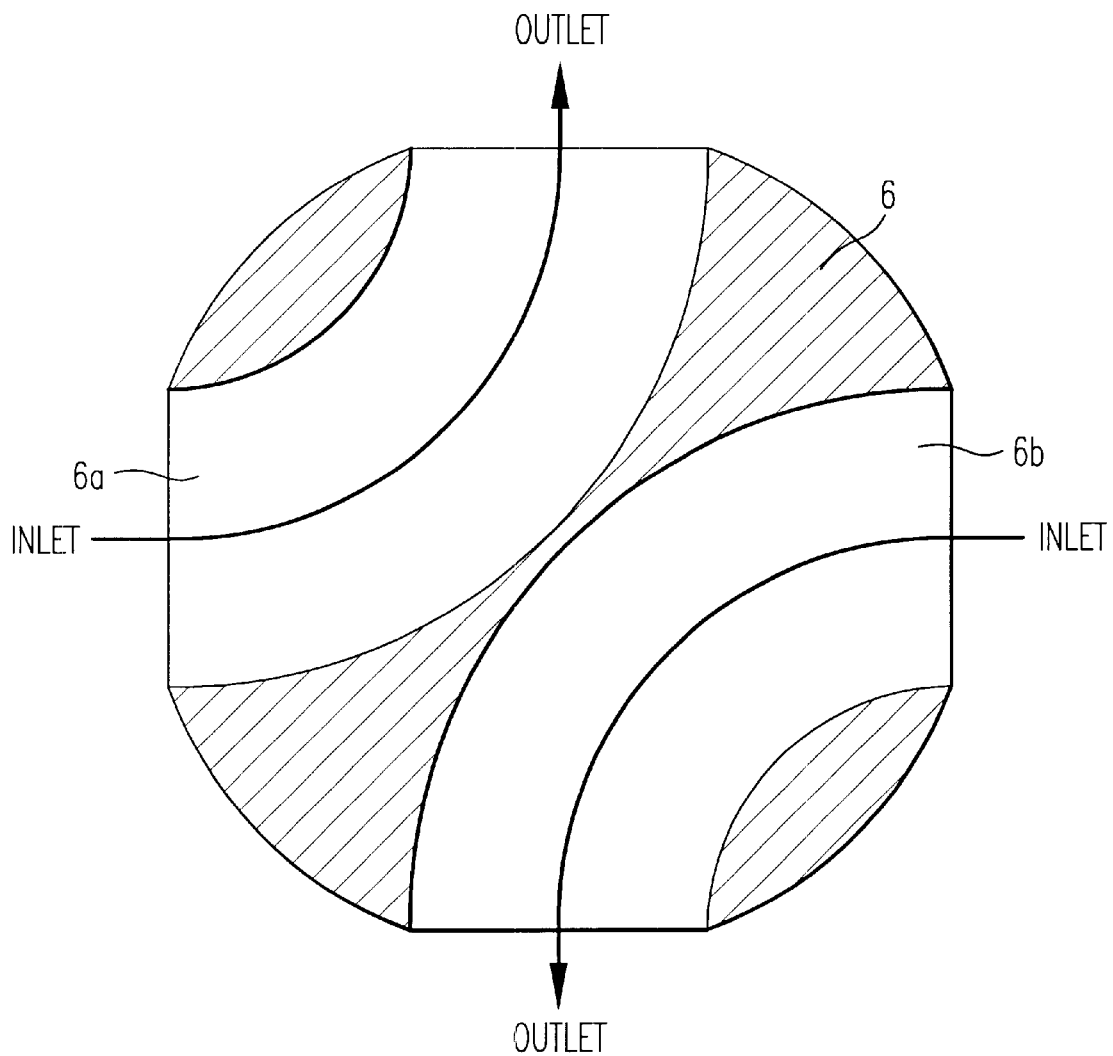
FIG. 7 is a cross-sectional view of the closure member of FIG. 6.

FIG. 4 is a cross-section of the assembled valve, while FIG. 5 is a cut-away view of the assembled valve. As discussed earlier, the housing in FIG. 3 has its top removed. The top is depicted at 50 in FIG. 4, and includes an opening which receives the trunion 28. The trunion (and thus the ball closure) is thereby rotatably mounted with respect to the housing, with the bearing surfaces 28a (see FIGS. 1 and 2) in sliding contact with the housing top 50. Within the space 52 between the housing top and the bearing surfaces 28a a suitable seal, such as an O-ring, can be disposed to prevent leakage through the top 50 of the housing. As shown in the drawing, fluid which enters from the right side of the housing will pass into port 22 of the closure 18, and then will exit through the port 26 of the closure and through the aperture 31 of the trunion 30 so that the flow exits the bottom of the valve (or the flow can be in the opposite direction). Flow which enters from the left side of the housing enters port 20 and then flows upwardly until it exits port 24 and apertures 29 of the upper trunion 28. The flow passing out of the apertures 29 then flows into the housing in the space between the ball closure and the housing, and the flow then exits the opening 44 (see FIG. 3) of the housing. Of course, suitable piping is connected to each of the openings of the valve housing. As noted earlier, the opening 44 is not sealed with respect to the closure member of the valve, but instead, the opening 44 communicates with a space between the housing and the closure member so that the fluid exiting trunion apertures 29 will pass through the space between the closure and the housing and will exit through opening 44 (or vice versa depending upon the flow direction). The closure member 18 is sealed with respect to the remaining apertures to prevent leakage of the fluid into the valve body or around the closure member.

As noted earlier, the upper trunion is sealed with respect to the housing top 50 by, for example, an O-ring seal 52. Similarly, the bottom opening 46 (FIG. 3) of the housing is sealed with respect to the trunion 30 by suitable means, such as an O-ring seal in the space shown at 54. Similar to the mounting of the top trunion, the bottom trunion 30 is rotatably received in the bottom opening of the housing, with bearing surfaces 30a (FIGS. 1 and 2) in sliding contact with the bottom surface of the housing at the housing opening 46. The top and bottom trunions 28, 30 can be connected to the closure member at the respective ports 24, 26, for example, by welding.

Although the seals about the upper and lower trunions are relatively easy to achieve, e.g., with O-ring seals, providing a durable seal at the ball closure and about the ports 20, 22 can be more complicated. In particular, the seal at the closure member is provided upon a spherical surface (i.e., where the closure is a ball closure) which moves across the seal repeatedly, and which can be subjected to forces associated with the fluid flow. In certain applications, the valve could cycle (i.e., change positions) one million times or more per year. Thus, it is desirable to provide a seal arrangement which is durable so that leakage is minimized despite repeated cycling of the valve.

In the arrangement shown in FIG. 4, a spring loaded seal assembly is provided at the left and right sides of the ball closure. Since the seal assemblies are the same on the left and right sides, the same reference numerals are utilized for simplicity. The seals are shown at 60, and are disposed within a flanged cylinder or sleeve 62. By way of example, the seals can be formed of a high density polyethylene, and the flanged cylinder 62 can be stainless steel. The flanged cylinder 62 provides for a proper positioning of the seal 60, and also provides a good sliding surface for a spring holder 64. The spring holder 64 is an annular disk-like member having a plurality of apertures or recesses 66 therein for receiving springs, such as helical springs. For example, eight recesses 66 can be distributed about the periphery of the spring holder 64 for accommodating eight springs. The spring holder 64 is slidable along the flanged cylinder 62, and therefore should also have an outer surface which provides for good sliding contact with the inner surface of the flanged cylinder 62. For example, the spring holder 64 can be formed of stainless, with a polyethylene sleeve or ring disposed about the spring holder for sliding contact with the flanged cylinder 62. Optionally, an O-ring can additionally be provided between the spring holder 64 and the seal 60 (at the outer periphery of the spring holder) for further prevention of leakage.

Fastened to the exterior of the housing are flanges 68, which provide mounting sites for connecting pipe flanges to the valve. Mounting of the flanges 68 to the housing causes loading of the springs (which extend between the spring holders 64 and the flanges 68). Once the flanges 68 are mounted and the springs are loaded, the spring holder 64 (which is in sliding contact with the flanged cylinder 62) in turn is urged against the seals 60 so that a tight seal is ensured against the ball closure 18. This arrangement is advantageous in a number of respects. The spring loading ensures that a tight seal is maintained against the ball closure. Since the spring holder 64 is slidably mounted, even upon the occurrence of wear, a tight seal is maintained, since the spring holder 64 can move toward the ball closure and continue to urge the seal 60 against the ball closure. It is to be understood that alternate seal assemblies can be utilized with the four way valve of the invention, however the use of a spring loaded seal assembly is presently preferred to ensure a tight seal over a large number of valve cycles. It is also to be understood that, although the seal assembly described above is advantageously utilized with the four way valve of the invention, it could also be utilized with other types of valves.

As to the other elements of FIGS. 4 and 5, a mounting bracket is shown at 70, and can be used for mounting whatever means are utilized for turning the valve via shaft 34 (e.g., an actuator, motor, etc.). Bolts 72 are provided for fastening the top 50 to the remainder of the housing, however, other fastening expedients could also be utilized. As also shown in FIG. 5, the flanges 68 include two sets of apertures 74, 76. One set of apertures 74 is utilized for fastening the flanges 68 to the valve housing (and thus loading the springs of the seal assemblies), while the other set of apertures 76 is utilized for mounting of a pipe flange to the valve housing flange 68 and mount of the necessary piping to the valve. In the present arrangement, the apertures 74 are not threaded. Fasteners are inserted into the apertures 74 and screw into threaded apertures provided in the housing walls.

In operation, the valve as discussed herein can provide for rapid switching or alternating of the fluid flow in a given system. For example, in the FIG. 4 position, the port 20 of the ball closure is in communication with the opening in the left side of the housing (the opening 40 of FIG. 3) and fluid entering the left side of the housing will then pass through the port 20, to the port 24, and then through the apertures 29 of the trunion 28 so that the flow exits through the opening 44 (FIG. 3). When the ball closure is rotated 180° from the FIG. 4 position, the port 22 is then in communication with the opening on the left side of the housing, so that the fluid entering the left side of the housing exits through port 26 and then through the bottom opening of the housing (opening 46 in FIG. 3). Similarly, in the position shown in FIG. 4, the port 22 is in communication with the right side opening of the housing so that the flow which enters from the right passes through port 26 and exits through the bottom of the housing. However, when the valve is rotated 180° from the position shown in FIG. 4, the port 20 is in communication with the right side opening of the housing so that the flow entering the right side of the housing passes from port 20, through port 24 and apertures 29, and then passes through the space between the ball closure and the valve housing to exit opening 44 of the housing.

As should be apparent, a four way valve in accordance with the invention can be utilized for a wide number of applications. Depending upon the system design or the fluid pressures encountered, a particular port might be an inlet for one valve position and an outlet for another valve position. Alternately, the fluid could be fed to only one inlet, so that the valve is essentially utilized to change the flow path for that fluid. As a further alternative, the four way valve can be utilized for reversing a flow. For example, a fluid can be fed into port 22, so that it flows to port 26 in the position shown in FIG. 4. A pump can be connected to the left side of the valve such that when the valve is rotated 180° from the position shown in FIG. 4, the fluid which flowed from port 22 to outlet 26 is then pumped from port 26 to port 22. The foregoing are merely exemplary, and the four way valve of the invention can be utilized in a variety of applications.

As noted earlier, although a particular form of the present invention has been described herein, for example, with the closure member a ball closure member having a pair of trunion mountings the invention is not limited to the arrangement specifically depicted. For example, the closure could be provided in different forms, for example, with a cylindrical closure member. In addition, in lieu of the use of a pair of trunion mountings, a single trunion mounting could be provided at either the top or the bottom of the closure member, or the ball closure could be mounted without the use of trunions.

Obviously, numerous modifications and variations are possible in light of the above teachings. It is therefore to be understood that, within the scope of the appended claims, the present invention can be practiced otherwise than as specifically disclosed herein.

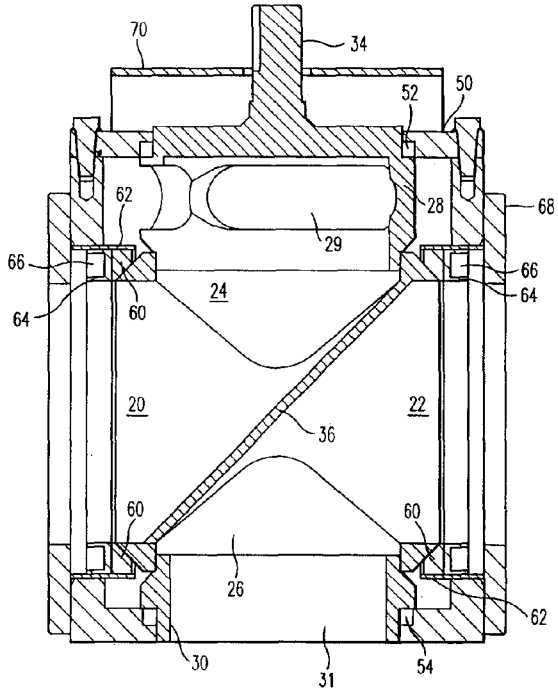

What is claimed as new and desired to be secured by Letters Patent of the United States is:

1. A valve comprising:
    a closure member having first, second, third and fourth ports, a first flow path extending through said closure member from said first port to said third port, and a second flow path extending through said closure member from said second port to said fourth port, and wherein said first flow path is isolated from said second flow path;
    a housing having first, second, third and fourth openings;
    wherein a space is provided inside of said housing between said closure member and said housing, and wherein said first opening of said housing and said first port of said closure member are in communication with said space such that fluid flowing through said first port of said closure member flows through said space and through said first opening of said housing;
    said housing including top and bottom walls and at least three side walls, and wherein said first, third and fourth openings of said housing each extend through a different one of said at least three side walls.

2. A valve as recited in claim 1, further including a trunion mounted to said closure member at said second port, and wherein said trunion is received in said second opening of said housing.

3. A valve as recited in claim 1, further including a seal assembly, said seal assembly comprising:
    (a) a seal member for providing a seal between said closure member and said housing;
    (b) a sleeve for holding said seal member;
    (c) at least one spring;
    (d) a spring holder slidably mounted within said sleeve for holding said at least one spring; and
    (e) a flange removably mountable upon said housing about said at least one opening, and wherein when said flange is mounted upon said housing said spring and said spring holder are disposed between said seal and said flange and said spring is under compression such that a force of said spring urges said seal against said closure member.

4. A valve as recited in claim 1, wherein said closure member is rotatable about an axis of rotation, and wherein said axis of rotation extends through said top and bottom walls of said housing and through said first and second ports of said closure member.

5. A valve as recited in claim 4, wherein said axis of rotation extends through said second opening of said housing.

6. A valve comprising:
    a closure member having first, second, third and fourth ports;
    a housing having first, second, third and fourth openings;
    wherein a space is provided inside of said housing between said closure member and said housing, and wherein said first opening of said housing and said first port of said closure member are in communication with said space such that fluid flowing through said first port of said closure member flows through said space and through said first opening of said housing;
    the valve further including a trunion mounted to said closure member at said first port, said trunion including at least one aperture in communication with said space, such that fluid flowing through said first port of said closure member flows through said aperture, said space and said first opening of said housing.

7. A valve as recited in claim 6, wherein said housing includes a fifth opening which receives said trunion.

8. A valve as recited in claim 7, wherein said valve includes a second trunion connected to said closure member at said second port, and wherein said second opening of said housing receives said second trunion.

9. A valve comprising:
    a closure member having first, second, third and fourth ports;
    a housing having first, second, third and fourth openings;
    wherein a space is provided inside of said housing between said closure member and said housing, and wherein said first opening of said housing and said first port of said closure member are in communication with said space such that fluid flowing through said first port of said closure member flows through said space and through said first opening of said housing;
    wherein said closure member is rotatable about an axis of rotation between first and second positions, said axis of rotation extending through said first and second ports of said closure member and through said second opening of said housing, and wherein in said first position:
        (a) said first port of said closure member is in communication with said first opening of said housing;
        (b) said second port of said closure member is in communication with said second opening of said housing;
        (c) said third port of said closure member is in communication with said third opening of said housing; and
        (d) said fourth port of said closure member is in communication with said fourth opening of said housing;
        and wherein in said second position:
        (e) said first port of said closure member is in communication with said first opening of said housing;
        (f) said second port of said closure member is in communication with said second opening of said housing;

(g) said third port of said closure member is in communication with said fourth opening of said housing; and (h) said fourth port is in communication with said third opening of said housing.

10. A valve as recited in claim 9, wherein said housing includes top and bottom walls, wherein said axis of rotation extends through said top and bottom walls, and wherein said housing includes at least three side walls, and further wherein said first, third and fourth openings of said housing each extend through a different one of said at least three side walls.

11. A valve comprising:

a closure member having first, second, third and fourth ports;

a housing having first, second, third and fourth openings;

wherein a space is provided inside of said housing between said closure member and said housing, and wherein said first opening of said housing and said first port of said closure member are in communication with said space such that fluid flowing through said first port of said closure member flows through said space and through said first opening of said housing;

wherein said closure member is movable between first and second positions, and wherein in said first position:

(a) said first port of said closure member is in communication with said first opening of said housing;

(b) said second port of said closure member is in communication with said second opening of said housing;

(c) said third port of said closure member is in communication with said third opening of said housing; and (d) said fourth port of said closure member is in communication with said fourth opening of said housing;

and wherein in said second position:

(e) said first port of said closure member is in communication with said first opening of said housing;

(f) said second port of said closure member is in communication with said second opening of said housing;

(g) said third port of said closure member is in communication with said fourth opening of said housing; and (h) said fourth port is in communication with said third opening of said housing;

wherein said closure member comprises a ball closure member having a first bore forming said first and second ports and a second bore forming said second and third ports, and wherein said first bore and said second bore intersect at an intersection, said ball closure further including a separator extending across said intersection such that said separator isolates said first port from said second port and said separator isolates said third port from said fourth port, wherein a first flow path through said closure member extends from said first port to said third port and a second flow path through said closure member extends from said second port to said fourth port.

12. A valve comprising:

a closure member having a first bore extending therethrough to form first and second ports, said closure member further including a second bore extending therethrough to form third and fourth ports, wherein said first bore and said second bore intersect at an intersection;

said closure member further including a separator which extends across said intersection such that said first port is isolated from said second port and said third port is isolated from said fourth port, wherein a first flow path through said closure member extends from said first port to said third port and a second flow path through said closure member extends from said second port to said fourth port; and a housing within which said closure member is disposed, said housing including first, second, third and fourth openings to provide fluid passageways through said housing for said first, second, third and fourth ports.

13. A valve as recited in claim 12, wherein said closure member is a ball closure member, said first bore and said second bore are cylindrical, and said separator is elliptical.

14. A valve as recited in claim 13, wherein said ball closure member includes a first trunion and a second trunion for rotatably mounting said ball closure member, and wherein said housing further includes a fifth opening which receives said first trunion, and wherein said second opening of said housing receives said second trunion.

15. A valve as recited in claim 14, wherein said first trunion is mounted to said ball closure member at said first port, said first trunion including at least one aperture which is in communication with a space inside of said housing with said space between said ball closure and an inner surface of said housing, and further wherein said first opening of said housing is in communication with said space such that fluid flowing through said first port flows through said at least one aperture, through said space and through said first opening of said housing.

16. A valve as recited in claim 15, wherein said second trunion is mounted to said ball closure member at said second port, and further wherein said second trunion includes an aperture such that fluid flowing through said second port flows through said aperture of said second trunion and through said second opening of said housing.

17. A valve as recited in claim 16, wherein said ball closure member is rotatable between first and second positions, and wherein in said first position said third port of said ball closure member is in communication with said third opening of said housing and said fourth port of said ball closure member is in communication with said fourth opening of said housing; and in said second position said third port of said ball closure member is in communication with said fourth opening of said housing and said fourth port of said ball closure member is in communication with said third opening of said housing.

18. A valve as recited in claim 12, further including a seal assembly, said seal assembly comprising:

(a) a seal member for providing a seal between said closure member and said housing;

(b) a sleeve for holding said seal member;

(c) at least one spring;

(d) a spring holder slidably mounted within said sleeve for holding said at least one spring; and (e) a flange removably mountable upon said housing about said at least one opening, and wherein when said flange is mounted upon said housing said spring and said spring holder are disposed between said seal and said flange and said spring is under compression such that a force of said spring urges said seal against said closure member.

19. A valve as recited in claim 12, wherein said closure member is movable between first and second positions, and wherein in said first position:

(a) said first port of said closure member is in communication with said first opening of said housing;
(b) said second port of said closure member is in communication with said second opening of said housing;
(c) said third port of said closure member is in communication with said third opening of said housing; and
(d) said fourth port of said closure member is in communication with said fourth opening of said housing;
and wherein in said second position:
(e) said first port of said closure member is in communication with said first opening of said housing;
(f) said second port of said closure member is in communication with said second opening of said housing;
(g) said third port of said closure member is in communication with said fourth opening of said housing; and
(h) said fourth port is in communication with said third opening of said housing.

20. A valve as recited in claim 19, wherein a stem is connected to said closure member for rotating said closure member from said first position to said second position, and wherein said first position is 180° from said second position.

21. A valve as recited in claim 19, further including a trunion for rotatably mounting said closure member, said trunion mounted to said closure member at said first port, said trunion including at least one aperture which is disposed inside of said housing, and wherein said first port of said closure member communicates with said first opening of said housing by way of said at least one aperture of said trunion and a space inside of said housing between said housing and said closure member.

22. A valve as recited in claim 21, wherein said housing further includes a fifth opening which receives said trunion.

23. A valve as recited in claim 22, further including a second trunion mounted to said closure member at said second port.

24. A valve as recited in claim 23, wherein said second opening of said housing receives said second trunion.

25. A valve as recited in claim 21, wherein said closure member is a ball closure member.

26. A valve as recited in claim 19, further including a pair of seals which contact said closure member about said third and fourth ports when said valve is in said first position and said second position.

27. A valve as recited in claim 26, further including a plurality of springs for urging said pair of seals against said closure member.

28. A valve comprising:
a rotatable closure member;
a housing having at least one opening; and
a seal assembly, said seal assembly comprising:
(a) a seal member for providing a seal between said closure member and said housing;
(b) a sleeve for holding said seal member, said sleeve including a flanged portion which holds said seal member with said seal member disposed in said sleeve, wherein said sleeve is mounted to said housing at said at least one opening such that said seal member provides a seal between said closure member and said housing about said at least one opening;
(c) at least one spring;
(d) a spring holder slidably mounted within said sleeve for holding said at least one spring; and
(e) a flange removably mountable upon an exterior surface of said housing about said at least one opening, wherein said flange is separate from said sleeve, and wherein when said flange is mounted upon said housing said spring and said spring holder are disposed between said seal and said flange and said spring is under compression such that a force of said spring urges said seal against said closure member.

29. A valve as recited in claim 28, wherein said spring holder includes a plurality of recesses which hold a plurality of springs.

30. A valve as recited in claim 28, wherein said closure member is a ball closure member, having a bore forming two ports, and wherein said housing includes two openings, and further wherein said seal assembly is provided at each of said two openings of said housing.

31. A valve as recited in claim 28, wherein said housing includes two openings, and wherein said seal assembly is provided at each of said two openings, and further wherein said closure member includes two ports which, in a first position of said rotatable closure member, are respectively aligned with said two openings of said housing, and wherein said seals of said seal assemblies respectively extend about said two ports in said first position.

32. A valve as recited in claim 31, further including first and second trunions connected to said rotatable closure member, and wherein said first and second trunions extend through said housing to rotatably mount said rotatable closure member in said housing.

33. A valve comprising:
a rotatable closure member;
a housing having at least one opening; and
a seal assembly, said seal assembly comprising:
(a) a seal member for providing a seal between said closure member and said housing;
(b) a sleeve for holding said seal member;
(c) at least one spring;
(d) a spring holder slidably mounted within said sleeve for holding said at least one spring; and
(e) a flange removably mountable upon said housing about said at least one opening, and wherein when said flange is mounted upon said housing said spring and said spring holder are disposed between said seal and said flange and said spring is under compression such that a force of said spring urges said seal against said closure member;
wherein said closure member includes first, second, third and fourth ports, and further wherein said housing includes first, second, third and fourth openings, and further wherein said closure member is rotatable about an axis of rotation between first and second positions, said axis of rotation extending through said first and second ports of said closure member and through said second opening of said housing, and wherein in said first position;
(a) said first port of said closure member is in communication with said first opening of said housing;
(b) said second port of said closure member is in communication with said second opening of said housing;
(c) said third port of said closure member is in communication with said third opening of said housing; and
(d) said fourth port of said closure member is in communication with said fourth opening of said housing;
and wherein in said second position:
(e) said first port of said closure member is in communication with said first opening of said housing;

(f) said second port of said closure member is in communication with said second opening of said housing;

(g) said third port of said closure member is in communication with said fourth opening of said housing; and (h) said fourth port is in communication with said third opening of said housing.

34. A valve as recited in claim 33, wherein said housing includes top and bottom walls, wherein said axis of rotation extends through said top and bottom walls, and wherein said housing includes at least three side walls, and further wherein said first, third and fourth openings of said housing each extend through a different one of said at least three side walls.

35. A valve comprising:

a rotatable closure member;

a housing having at least one opening; and a seal assembly, said seal assembly comprising:
  (a) a seal member for providing a seal between said closure member and said housing;
  (b) a sleeve for holding said seal member;
  (c) at least one spring;
  (d) a spring holder slidably mounted within said sleeve for holding said at least one spring; and
  (e) a flange removably mountable upon said housing about said at least one opening, and wherein when said flange is mounted upon said housing said spring and said spring holder are disposed between said seal and said flange and said spring is under compression such that a force of said spring urges said seal against said closure member;

wherein said closure member includes first, second, third and fourth ports, and further wherein said housing includes first, second, third and fourth openings, and further wherein said closure member is rotatable between first and second positions, and wherein in said first position;
  (a) said first port of said closure member is in communication with said first opening of said housing;
  (b) said second port of said closure member is in communication with said second opening of said housing;
  (c) said third port of said closure member is in communication with said third opening of said housing; and
  (d) said fourth port of said closure member is in communication with said fourth opening of said housing;

and wherein in said second position:
  (e) said first port of said closure member is in communication with said first opening of said housing;
  (f) said second port of said closure member is in communication with said second opening of said housing;
  (g) said third port of said closure member is in communication with said fourth opening of said housing; and
  (h) said fourth port is in communication with said third opening of said housing; and wherein said closure member includes a trunion for rotatably mounting said closure member, said trunion connected to said closure member at said first port, and wherein said housing further includes a fifth opening which receives said trunion.

36. A valve as recited in claim 35, further including a second trunion connected to said closure member at said second port, wherein said second trunion is received in said second opening of said housing.

37. A valve comprising:

a ball closure member which is rotatable about an axis of rotation, said ball closure member having first, second, third and fourth ports disposed at four different locations about said ball closure member;

a housing having first, second, third and fourth openings;

wherein a space is provided inside of said housing between said closure member and said housing, and wherein said first opening of said housing and said first port of said closure member are in communication with said space such that fluid flowing through said first port of said closure member flows through said space and through said first opening of said housing, and wherein said axis of rotation extends through said first port of said closure member.

38. A valve as recited in claim 37, wherein said housing includes top and bottom walls through which the axis of rotation extends, and further wherein said housing includes at least three side walls, and wherein said first, third and fourth openings of said housing each extend through a different one of said at least three side walls.

39. A valve as recited in claim 38, wherein said axis of rotation extends through said second port of said closure member and through said second opening of said housing.

40. A valve as recited in claim 37, wherein said axis of rotation extends through said second port of said closure member and through said second opening of said housing.

* * * * *

UNITED STATES PATENT AND TRADEMARK OFFICE
CERTIFICATE OF CORRECTION

PATENT NO.   : 6,401,754 B1
DATED        : June 11, 2002
INVENTOR(S)  : Melvin Winquist et al.

Figure 6:
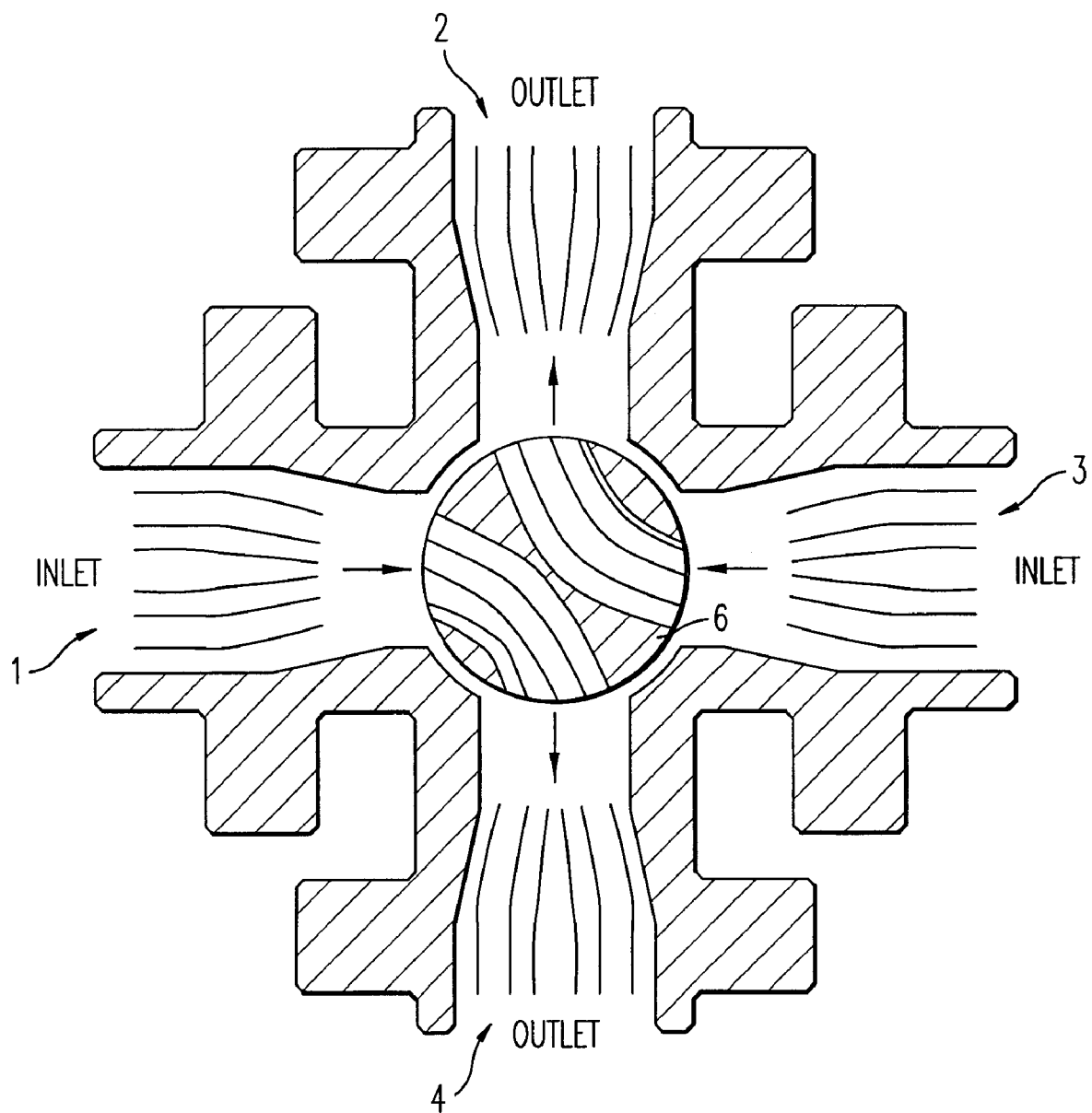
FIG. 6 is a schematic representation of a conventional four way valve.

It is certified that error appears in the above-identified patent and that said Letters Patent is hereby corrected as shown below:

The title page should be deleted and substitute therefore the attached title page.
Delete drawing sheets 4-6, and substitute therefore the drawing sheets, consisting of Figs. 4-6, as shown on the attached pages.

Signed and Sealed this

Fifth Day of August, 2003

JAMES E. ROGAN
*Director of the United States Patent and Trademark Office*

(12) United States Patent
Winquist et al.

(10) Patent No.: US 6,401,754 B1
(45) Date of Patent: Jun. 11, 2002

(54) FOUR WAY VALVE

(75) Inventors: Melvin Winquist, Worcester, MA (US); David Bayreuther, Griswold, CT (US)

(73) Assignee: Metso Automation USA Inc., Dover, DE (US)

( * ) Notice: Subject to any disclaimer, the term of this patent is extended or adjusted under 35 U.S.C. 154(b) by 0 days.

(21) Appl. No.: 09/686,819

(22) Filed: Oct. 12, 2000

(51) Int. Cl.[7] ............................................. F16K 11/08
(52) U.S. Cl. ............................ 137/625.47; 251/174
(58) Field of Search .................. 137/625.43, 625.46, 137/625.47; 251/174

(56) References Cited

U.S. PATENT DOCUMENTS

| | | |
|---|---|---|
| 2,621,886 A | 12/1952 | Mueller |
| 2,623,724 A * | 12/1952 | Downey .................. 251/174 X |
| 2,631,002 A | 3/1953 | Mueller |
| 2,837,308 A * | 6/1958 | Shand ........................ 251/174 |
| 3,194,267 A * | 7/1965 | Lyon et al. ........... 137/624.43 X |
| 3,401,915 A | 9/1968 | Kim |
| 3,504,706 A * | 4/1970 | Schmitz .................. 137/625.43 |
| 3,826,466 A | 7/1974 | Scaglione |
| 3,848,637 A * | 11/1974 | Wilson ............... 137/625.43 X |
| 3,874,637 A | 4/1975 | Jones |
| 3,906,997 A | 9/1975 | Scaglione |
| 4,004,775 A | 1/1977 | Jones |
| 4,318,420 A | 3/1982 | Calvert |
| 4,428,561 A * | 1/1984 | Thompson .................. 251/174 |
| 4,477,055 A | 10/1984 | Partridge |
| 4,483,511 A | 11/1984 | Kushida |
| 4,506,697 A | 3/1985 | Marchant |
| 4,601,308 A | 7/1986 | Stone |
| 4,836,250 A | 6/1989 | Krambrock |
| 4,911,408 A | 3/1990 | Kemp |
| 4,972,877 A * | 11/1990 | Halemba et al. ..... 137/625.43 X |
| 5,163,655 A | 11/1992 | Chickering, III |
| 5,207,246 A | 5/1993 | Meyer |
| 5,271,426 A | 12/1993 | Clarkson |
| 6,230,744 B1 * | 5/2001 | Ahrweiler ............... 137/625.47 |

FOREIGN PATENT DOCUMENTS

WO      98/36122      *   8/1998

* cited by examiner

*Primary Examiner*—John Rivell
(74) *Attorney, Agent, or Firm*—Oblon, Spivak, McClelland, Maier & Neustadt, P.C.

(57) ABSTRACT

A four way valve which is relatively easy to manufacture and which is smaller than conventional four way valves for a given bore size or flow capacity. The valve can be formed utilizing a closure having a pair of intersecting bores, with a separator provided within the closure to form two isolated passageways or flow paths. An improved sealing/seating arrangement is also provided.

40 Claims, 8 Drawing Sheets